United States Patent [19]

Pekruhn et al.

[11] Patent Number: 4,887,092

[45] Date of Patent: Dec. 12, 1989

[54] THERMAL PRINTING METHOD

[75] Inventors: Wolfgang Pekruhn; Ralf Kaiser; Hartmut Kirchhoff, all of Berlin, Fed. Rep. of Germany

[73] Assignee: Siemens Aktiengesellschaft, Berlin and Munich, Fed. Rep. of Germany

[21] Appl. No.: 280,816

[22] Filed: Dec. 7, 1988

[30] Foreign Application Priority Data

Dec. 7, 1987 [DE] Fed. Rep. of Germany ....... 3741799

[51] Int. Cl.[4] ........................ G01D 15/10; A05B 3/02; B41J 3/50

[52] U.S. Cl. ................................ 346/1.1; 346/76 PH; 219/484; 219/485; 400/120

[58] Field of Search ........................... 346/1.1, 76 PH; 219/216,484,485; 400/120

[56] References Cited

U.S. PATENT DOCUMENTS

| | | | |
|---|---|---|---|
| 4,536,774 | 8/1985 | Inui et al. | 346/76 PH |
| 4,574,293 | 3/1986 | Inui et al. | 346/76 PH |
| 4,590,484 | 5/1986 | Matsushita | 346/76 PH |
| 4,633,269 | 12/1986 | Mikami et al. | 346/76 PH |
| 4,717,924 | 1/1988 | Bangs et al. | 346/76 PH |

FOREIGN PATENT DOCUMENTS

| | | |
|---|---|---|
| 0112474 | 11/1983 | European Pat. Off. . |
| 0174751 | 8/1985 | European Pat. Off. . |
| 1964389 | 7/1970 | Fed. Rep. of Germany . |
| 3302388A1 | 8/1983 | Fed. Rep. of Germany . |
| 62-28263 | 2/1987 | Japan . |
| 62-28264 | 2/1987 | Japan . |

*Primary Examiner*—Clifford C. Shaw
*Assistant Examiner*—Gerald E. Preston
*Attorney, Agent, or Firm*—Hill, Van Santen, Steadman & Simpson

[57] ABSTRACT

In a prior art thermal printing method, the heating elements of a thermal printing head are driven in such fashion that the temperature of each and every individual heating element is first measured individually and successively before this heating element is charged with a current pulse whose intensity of current is dimensioned dependent on the measured temperature. In order to increase the printing speed, the temperatures of all heating elements (R1 . . . Rn) are first successively measured in the novel method fo the present invention in every drive cycle and are extrapolated to isochronic cooling temperature values dependent on the cooling characteristic of the heating elements (R1 . . . Rn). The heating elements (R1 . . . Rn) are then charged with current pulses whose pulse durations are individually dimensioned for every heating element (R1 . . . Rn) dependent on the cooling temperature value calculated for this heating element (R1 . . . Rn).

6 Claims, 2 Drawing Sheets

THERMAL PRINTING METHOD

BACKGROUND OF THE INVENTION

The present invention is directed to a thermal printing method wherein, for a cyclical drive of heating elements of a thermal printing head, the temperature of each and every individual heating element is first measured in every drive cycle before the heating element intended for printing is charged with a current pulse, the energy of this current pulse being controlled as a function of the measured temperature.

In a prior art thermal printing method disclosed in German published application No. 1 964 389, a drive of the heating elements of a thermal printing head occurs such that the momentary temperature of each and every individual heating element intended for printing is measured individually and successively with a temperature sensor individually allocated thereto. The heating element is charged with a current pulse immediately thereafter, the current magnitude of this current pulse being controlled as a function of the measured temperature by an amplifier following the temperature sensor. This is intended to reduce the influences of the ambient temperature and of the temperature of the printing head on the printing quality, this latter temperature of the printing head being dependent on the drive of the heating elements that was previously applied to the heating elements. Since the respective heating elements intended for printing are driven in individual succession, the printing time required for printing a point grid corresponding to the arrangement of the heating elements is relatively great.

In a thermal printing method disclosed by European Pat. No. EP-A 0 112 474, a simultaneous, temperature-dependent current charging of heating elements of a thermal printing head is provided. The momentary, actual temperature conditions at the individual heating elements are thereby left out of consideration since the temperature measurement and, thus, the current charging occurs globally for all heating elements.

Finally, for identifying malfunctioning heating elements of a thermal printing head, European Pat. No. EP-A-0 174 751 discloses that the electrical resistances thereof be measured by charging the heating elements with a test current individually and in succession. The measured values of resistance are compared to corresponding reference values stored in a memory, whereupon the appertaining heating element is recognized as having malfunctioned for a deviation that exceeds a prescribed level.

SUMMARY OF THE INVENTION

In the thermal printing method initially set forth, the present invention provides that a cooling pause for all heating elements is provided which occurs following the preceding sensing cycle and at the beginning of each and every sensing cycle. The temperatures of the heating elements are successively measured during this cooling pause. The present invention also provides that cooling temperature values referenced of a common point in time are calculated for all heating elements from the measured temperature values successively obtained in this manner and from a characteristic cooling curve of the heating elements that is stored in a memory. Following the cooling pause, all heating elements intended for printing are simultaneously charged with the current pulses whose respective pause duration is individually dimensioned for every heating element dependent on the cooling temperature value respectively identified for this heating element. The significant advantage of the thermal printing method of the present invention is the high printing speed that can be achieved because, differing from the thermal printing method disclosed by German published application No. 19 64 389, all heating elements intended for printing are simultaneously charged with the current pulses whose respective pulse duration is individually measured for every printing heating element in accordance with the temperature measured for the heating element. The temperature measurements occur in the cooling pause shared by all heating elements, this cooling pause being required between successive time intervals of charging the heating elements with current. The measured temperature values successively calculated for the individual heating elements on the basis of the stored, characteristic cooling curve of the heating elements are extrapolated to isochronic cooling temperature values at the point in time at which the heating elements are charged with the current elements. The control of the current pulse durations of the current pulses simultaneously supplied to the heating elements occurs as a function of the simultaneous, momentary temperature conditions at the individual heating elements. In this context, it would in fact be conceivable to simultaneously measure the temperatures at the individual heating elements. To this end, however, a plurality of measuring means corresponding in number to the plurality of heating elements would be required, resulting in an extremely high number of components.

According to a preferred embodiment of the method of the present invention, the electrical resistances of the heating elements are measured for measuring the temperatures of the heating elements and these electrical resistances are compared to reference resistance values stored in a further memory, these reference resistance values having been calculated once for the heating elements at a reference temperature. The significant advantage of the resistance measurement at the heating elements is that the actual temperature conditions at the heating elements are directly acquired since the electrical resistance of each and every heating element is directly dependent on its momentary temperature. The calculation of the resistance reference values preferably occurs before the respective thermal printing means is placed in operation, such that the electrical resistances of all heating elements are successively measured in a measuring cycle at room temperature and these electrical resistances are stored in the further memory as resistance reference values. Advantageously this measuring cycle can be automatically executed before every renewed initialization of the thermal printing means, so that changes in the values of electrical resistance of the heating elements caused by aging have no influence on the precision of the temperature measurements in the method of the present invention.

As already set forth above, the current-charging of the respective heating elements intended for printing occurs as a function of cooling temperature values normed to a common point in time that are derived from the successively measured temperature values. In this context, it is provided within the framework of the present invention, that, for calculating the cooling temperature values, the respectively measured temperature value of every heating element is reduced by a deduction value that is determined from the curve of the stored cooling curve of the heating elements and from the respective time difference between the temperature measurement and the following charging of all heating elements with current pulses. The deduction values by which the measured temperature values are reduced thereby correspond to the amount of cooling of the associated heating elements beginning with the respective point in time of the temperature measurement up to the point in time shared by all heating elements at which they are charged with the current pulses. Since the respective time differences between the temperature measurements and the charging with current pulses involve values individually determined for all heating elements, the deduction values and, thus, the cooling temperature values of the heating elements at the point in time at which they are charged with current can be calculated for every individual heating element on the basis of the stored cooling curve derived from the respective measured temperature values.

In order to take the influence of the ambient temperature or of the temperature level of the thermal printing head on the cooling behavior of the heating elements into consideration, it is provided in an advantageous development of the thermal printing method of the present invention in combination with the calculation of the isochronic cooling temperature values that the temperature of the thermal printing head in the region of the heating elements is measured with a temperature sensor means and that the characteristics of the stored cooling curve of the heating elements is matched to the temperature of the thermal printing head dependent on this measured temperature. Alternatively or in addition thereto, the temperature of the thermal printing head can be calculated within the framework of a calculating program dependent on the measured temperature values measured in the preceding drive cycles and as a result the stored cooling curve can be adapted to the temperature of the thermal printing head.

As disclosed, for example, by German published application No. 33 02 388, the power for driving the heating elements of a thermal printing head can be reduced in that the heating elements are successively driven in groups. In this context, the temperatures of the heating elements of the group to be respectively driven next are measured isochronically with the currently driven group in the framework of the present invention for a drive of the heating elements by charging the heating elements with current pulses that successively occur in groups.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
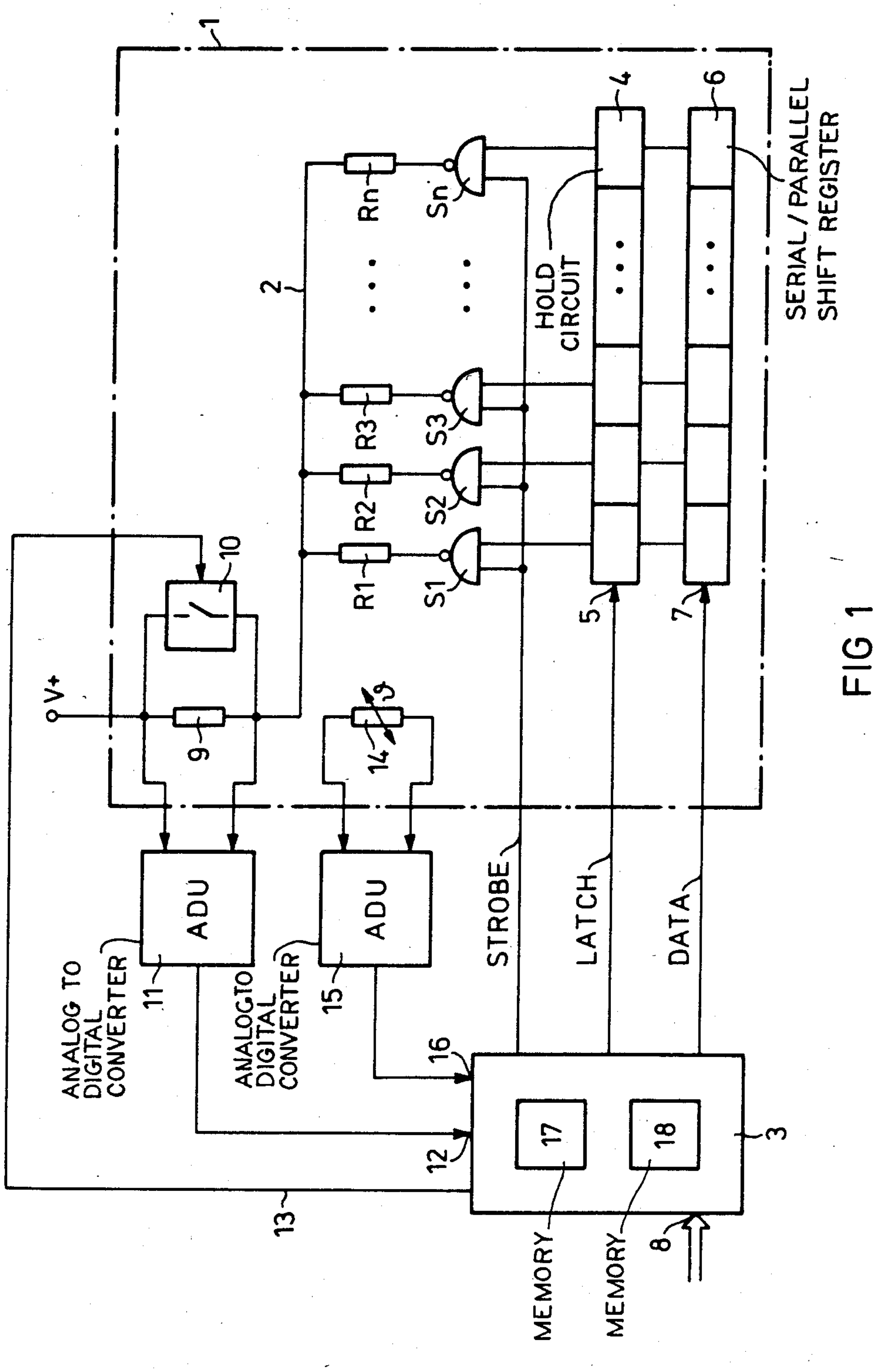
FIG. 1 is a circuit diagram in partial block diagram form of an embodiment of a thermal printing means for implementing the method of the present invention.

FIG. 1 shows a schematic illustration of the circuit-oriented structure of a preferred embodiment of a thermal printing means for the implementation of the method of the present invention. A plurality of individual heating elements R1 . . . Rn are closely positioned next to one another along a line on a thermal printing head 1 that is indicated here by a dot-dash boundary. In series with a controllable switch S1 . . . Sn respectively allocated to it, each individual heating element R1 . . . Rn is connected to a bus line 2 shared by all heating elements R1 . . . Rn. The controllable switches S1 . . . Sn are each composed of NAND elements each of which has a respective first input connected in common to a drive clock signal line STROBE at the output side of a control means 3. The NAND elements S1 . . . Sn also each have a second input connected to outputs of a hold circuit 4 allocated to them, this hold circuit 4 having a plurality of memory locations that corresponds in number to the plurality of heating elements R1 . . . Rn or, respectively, of the controllable swtiches S1 . . . Sn. The hold circuit 4 is connected via a control input 5 to a data acceptance signal line LATCH at the output side of the control means 3. At its input side, the hold circuit 4 is connected to parallel data outputs of a serial/parallel shift register 6 that has the same plurality of memory locations as the hold circuit 4. At its serial data input 7, the serial/parallel shift register 6 is connected to a data signal line DATA at the output side of the control means 3. The control means 3 has a data input 8 for receiving printing data and in accordance therewith the heating elements R1 . . . Rn are to be individually heated in order to achieve an information recording of the printing data on a heat-sensitive recording medium (not shown here) that lies against and is conducted past the heating elements R1 . . . Rn. Via the bus line 2 all the heating elements R1 . . . Rn are connected to a voltage source V+ in series with a precision resistor 9 and a controllable switch 10 that is connected in parallel to the resistor 9. A first analog-to-digital converter 11 has its input side connected to the precision resistor 9 and has its output side connected to a corresponding input of the control means 3. At its control input side, the controllable switch 10 is connected to a control line 13 coming from the control means 3. A temperature sensor means 14 composed of a temperature-dependent resistor is also arranged on the thermal printing head 1, this temperature-dependent resistor being connected to the input of a second analog-to-digital converter 15 that in turn has its output side connected to a corresponding input 16 of the control means 3.

As FIG. 1 further shows, the control means 3 contains a memory means 17 (only indicated here) in which the characteristic cooling curve of the heating elements R1 . . . Rn is stored and also contains a further memory means 18 in which resistance reference values calculated once for the heating elements R1 . . . Rn at a predetermined reference temperature are stored. By a program run, the information supplied to the control means 3 via the inputs 8, 12 and 16 is processed within the control means 3, whereby the contents of the memory means 17 and 18 are accessed and output signals are generated on the lines STROBE, LATCH, DATA and 13.

Upon initialization of the thermal printing means at a reference temperature that, for example, can be measured with the temperature sensor means 14 and can be supplied to the control means 3 via the analog-to-digital converter 15, the electrical resistance of the individual heating elements R1 . . . Rn are measured in accordance with the thermal printing method of the present invention. To that end, the controllable switch 10 is opened by a switch instruction output by the control means 3 via the control line 13, so that the heating elements R1 . . . Rn are connected to the voltage source V+ via the precision resistor 9. An individual data bit is supplied from the control means 3 via the data signal line DATA to the serial/parallel shift register 6 and is shifted from memory location to memory location in steps through the serial/parallel shift register 6. At every step, the data bit is reloaded into the hold circuit 4 by a data transfer signal on the data transfer signal line LATCH, so that the data bit can be subsequently shifted forward by one memory location in the serial/parallel shift register 6. With a drive clock signal generated on the drive clock signal line STROBE by the control means 3, the individual heating elements R1 . . . Rn are successively connected via the precision resistor 9 to the voltage source V+ in accordance with the momentary position of the data bit intermediately stored in the hold circuit 4. In consideration of the electrical resistances of the heating elements R1 . . . Rn, the precision resistor 9 is dimensioned such that only a low test current flows through the heating elements R1 . . . Rn and the temperature increase thereby produced in the heating elements R1 . . . Rn is negligibly slight. As a measure for the electrical resistance of each and every one of the successively driven heating elements R1 . . . Rn, the voltage drop across the precision resistor 9 is converted into a digital resistance reference value for the connected heating element R1 . . . Rn by the analog-to-digital converter 11 and is stored in the memory means 18. This measuring event can be multiply repeated during the useful life of the thermal printing means, so that changes in resistance of the heating elements R1 . . . Rn due to aging are taken into consideration.

Figure 2:
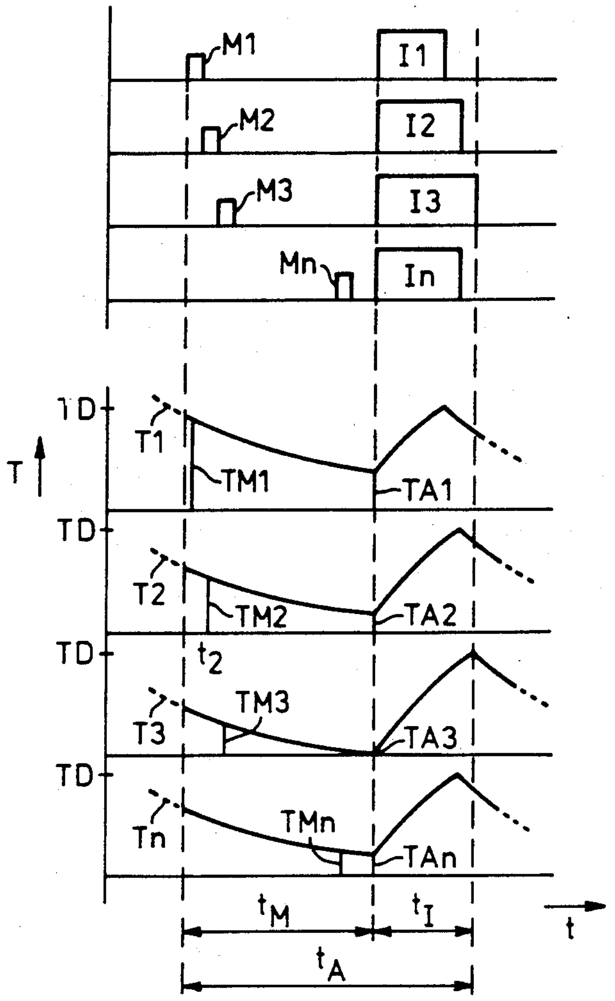
FIG. 2 is a diagram depicting the chronological succession of the temperature measurements and the following charging of the individual heating elements with current pulses as well as their temperature curves during a drive cycle.

The print mode of the thermal printing means shall be set forth below with reference to the diagrams in FIG. 2 and in FIG. 3. FIG. 2 shows the test currents M1 . . . Mn for temperature measurement supplied to the individual heating elements R1 . . . Rn and shows the current pulses I1 . . . In subsequently supplied to the heating elements R1 . . . Rn during a drive cycle $t_A$. FIG. 2 further shows the associated temperature curves T1 . . . Tn for the individual heating elements R1 . . . Rn. Every drive cycle $t_A$ is composed of a measuring phase $t_M$ that corresponds to a cooling pause for all heating elements R1 . . . Rn following the respectively preceding drive cycle and of a drive phase $t_I$ that follows thereupon. The controllable switch 10 is open during the measuring phase $t_M$. Via the data line DATA, an individual data bit is shifted in steps through the serial/parallel shift register 6 and, via the hold circuit 4, is supplied to the input side of a respectively different one of the NAND elements S1 . . . Sn at every step, so that the heating elements R1 . . . Rn are successively connected to the voltage source V+ in series with the precision resistor 9 dependent on the drive clock signal on the drive clock signal line STROBE. As a measure for the current electrical values of resistance of the individual heating elements R1 . . . Rn, the respective voltage drop across the precision resistor 9 is converted into a corresponding digital value in the analog-to-digital converter 11 and is supplied to the control means 3. In the control means 3, the respectively measured value of resistance for every heating element R1 . . . Rn is compared to the associated resistance reference value from the memory means 18 and the momentary temperature TM1 . . . Tmn of the associated heating element R1 . . . Rn is identified from the result of the comparison.

Since all heating elements R1 . . . Rn respectively intended for printing are to be simultaneously driven in the drive phase $T_I$ following the measuring phase $t_M$ dependent on their momentary temperatures, it is necessary to base the control of the current pulse charging of the individual heating elements R1 . . . Rn on temperature values of the heating elements R1 . . . Rn referred to a common point in time. For this reason, isochronic cooling temperature values TA1 . . . TAn for all heating elements R1 . . . Rn are calculated from the measured temperature values TM1 . . . TMn obtained in chronological succession, being calculated as a function of the cooling curve of the heating elements R1 . . . Rn stored in the memory means 17 and on the time difference between the point in time of the temperature measurement and the beginning of the following charging with current pulses, this time difference being respectively different for every heating elements R1 . . . Rn.

Figure 3:
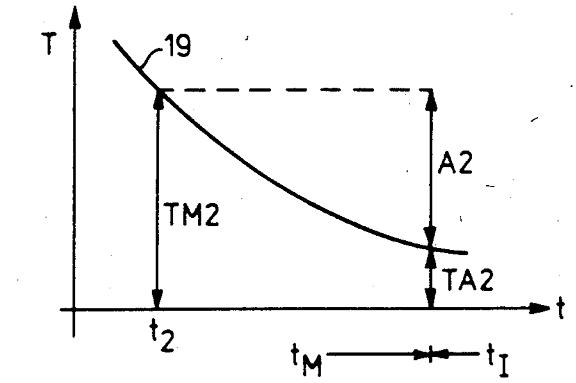
FIG. 3 is a diagram showing the stored cooling curve of the heating elements.

As schematically shown in FIG. 3 by way of example for the heating element R2, the measured temperature value TM2 measured at point in time $t_2$ is reduced by a deduction value A2 for this purpose. This deduction value A2 is derived from the stored cooling curve 19 of the heating elements R1 . . . Rn and from the time difference between the measuring point in time $t_2$ and the beginning of the drive phase $t_I$. The cooling curve 19 is stored in the form of measured value data that can be obtained by a plurality of individual resistance measurements at one or at a plurality of selected heating elements R1 . . . Rn during a cooling phase that follows a heating.

In the drive phase $t_I$ following the measuring phase $t_M$, the controllable switch 10 is closed, so that the heating elements R1 . . . Rn are connected directly to the voltage source V+ via the bus line 2. The printing data that identify the respective heating elements R1 . . . Rn intended for printing in the drive cycle $t_A$ are supplied to the control means 3 via the data input 8 and are read into the serial/parallel shift register 6 as serial data from this control means 3 via the data signal line DATA. This data is then present in the form of parallel data at the parallel outputs of the serial/parallel shift register 6. On the basis of a data transfer signal generated by the control means 3 on the data transfer signal line LATCH, the parallel data are reloaded from the serial/parallel shift register 6 into the hold circuit 4, so that the individual heating elements R1 . . . Rn are charged with a current from the voltage source 2 in accordance with the data intermediately stored in the hold circuit 4, being charged therewith with a drive clock signal generated on the drive clock signal line STROBE by the control means 3. The times of the current charging are differently dimensioned for each and every individual heating element R1 . . . Rn dependent on the colling temperature value TA1 . . . TAn respectively identified for this heating element R1 . . . Rn. The duration of the current pulse charging of the appertaining heating element R1 . . . Rn is longer for a lower identified cooling temperature value TA1 . . . TAm, so that all printing heating elements R1 . . . Rn reach approximately the same respective printing temperature $T_D$ at the end of their respective charging with current pulses.

Since the thermal printing head 1 heats up during its drive due to heat accumulation, the cooling behavior of the heating elements R1 . . . Rn changes during the printing duration. The temperature of thermal printing head 1 is therefore measured with the temperature sensor means 14 at regular time intervals and the curve of the stored cooling curve 19 of the heating elements R1 . . . Rn is adapted to the temperature of the thermal printing head.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A thermal printing method wherein, for a cyclical drive of heating elements (R1 . . . Rn) of a thermal printing head, the temperature (T1 . . . Tn) of every individual heating element (R1 . . . Rn) is measured first in every drive cycle ($t_A$) before the heating element (R1 . . . Rn) intended for printing is charged with a current pulse (I1 . . . In) whose energy is controlled as a function of the measured temperature (T1 . . . Tn), comprising the steps of: at the beginning of each and every drive cycle ($t_A$), providing a cooling pulse ($t_M$) for all heating elements (R1 . . . Rn) following a respectively preceding drive cycle, the temperatures (T1 . . . Tn) of the heating elements (R1 . . . Rn) being successively measured during this cooling pulse; calculating cooling temperature values (TA1 . . . TAn) referred to a common point in time for all heating elements (R1 . . . Rn) from successively obtained measured temperature values (TM1 . . . Tmn) and from a characteristic cooling curve of the heating elements (R1 . . . Rn) that is stored in a first means for providing a memory; and, following the cooling pulse ($t_M$) simultaneously charging all heating elements (R1 . . . Rn) intended for printing with the current pulses (I1 . . . In) whose respective pulse duration is individually dimensioned for every heating element (R1 . . . Rn) dependent on the cooling temperature value (TA1 . . . TAn) calculated from the respective heating element (R1 . . . Rn).

2. The thermal printing method according to claim 1, wherein, for measuring the temperatures (T1 . . . Tn) of the heating elements (R1 . . . Rn), the electrical resistances of said heating elements are measured and are compared to resistance reference values stored in a further means for providing a memory, said resistance reference values having been calculated once for the heating elements (R1 . . . Rn) at a reference temperature.

3. The thermal printing method according to claim 1, wherein, for calculating the cooling temperature values (TA1 . . . TAn), the respectively measured temperature value (TM1 . . . Tmn) of every heating element (R1 . . . Rn) is reduced by a deduction value that is calculated from the stored cooling curve of the heating elements (R1 . . . Rn) and from a respective time difference between the time of temperature measurement and a time of the following current pulse charging of all heating elements (R1 . . . Rn).

4. The thermal printing method according to claim 1, wherein, the temperature of the thermal printing head is measured in the region of the heating elements (R1 . . . Rn) with a means for temperature sensing; and wherein the stored cooling curve of the heating elements (R1 . . . Rn) is adapted to the temperature of the thermal printing head dependent on this measured temperature of the thermal printing head.

5. The thermal printing method according to claim 1, wherein the temperature of the thermal printing head is identified as a function of measured temperature values of the thermal printing head in preceding drive cycles; and wherein, the stored cooling curve is adapted to the temperature of the thermal printing head calculated in this fashion.

6. The thermal printing method according to claim 1 wherein, for a drive of the heating elements for charging of the heating elements with current pulses that occur successively in groups, the temperature of the heating elements of the group to be respectively driven next is isochronically measured with the current pulse charging of the heating elements of the group being currently driven.

* * * * *